United States Patent [19]

Grumbeck

[11] 4,027,057

[45] May 31, 1977

[54] SUNBURST WALL PLAQUE OR THE LIKE AND METHOD OF MAKING THE SAME

[75] Inventor: Victor N. Grumbeck, Bristol, Wis.

[73] Assignee: Beauti-Vue Products Corporation, Bristol, Wis.

[22] Filed: Dec. 24, 1975

[21] Appl. No.: 644,075

[52] U.S. Cl. .............................. 428/32; 139/384 R; 139/384 A; 139/386; 156/60; 156/65; 428/10; 428/12; 428/33; 428/37; 428/45; 428/52; 428/53; 428/64; 428/65; 428/66; 428/225; 428/259

[51] Int. Cl.² .............................. B32B 3/00

[58] Field of Search ................ 428/225, 10, 12, 32, 428/33, 37, 45, 52, 53, 64, 65, 66, 259; 139/384 R, 384 A, 386; 156/60, 65

[56] References Cited

UNITED STATES PATENTS

| | | | |
|---|---|---|---|
| 1,944,696 | 1/1934 | Reichl | 45/106 |
| 2,228,691 | 1/1941 | Grosser | 240/103 |

*Primary Examiner*—Marion E. McCamish
*Attorney, Agent, or Firm*—Hill, Gross, Simpson, Van Santen, Steadman, Chiara & Simpson

[57] ABSTRACT

A sunburst array of radially extending elements, such as fan foldable woven wood slates, connected along their radially extending sides, have means such as rigid panels securing the radially inner ends of the rigid elements and maintaining them in a substantially common plane, thereby providing a novelty article such as a sunburst plaque, or the like.

14 Claims, 8 Drawing Figures

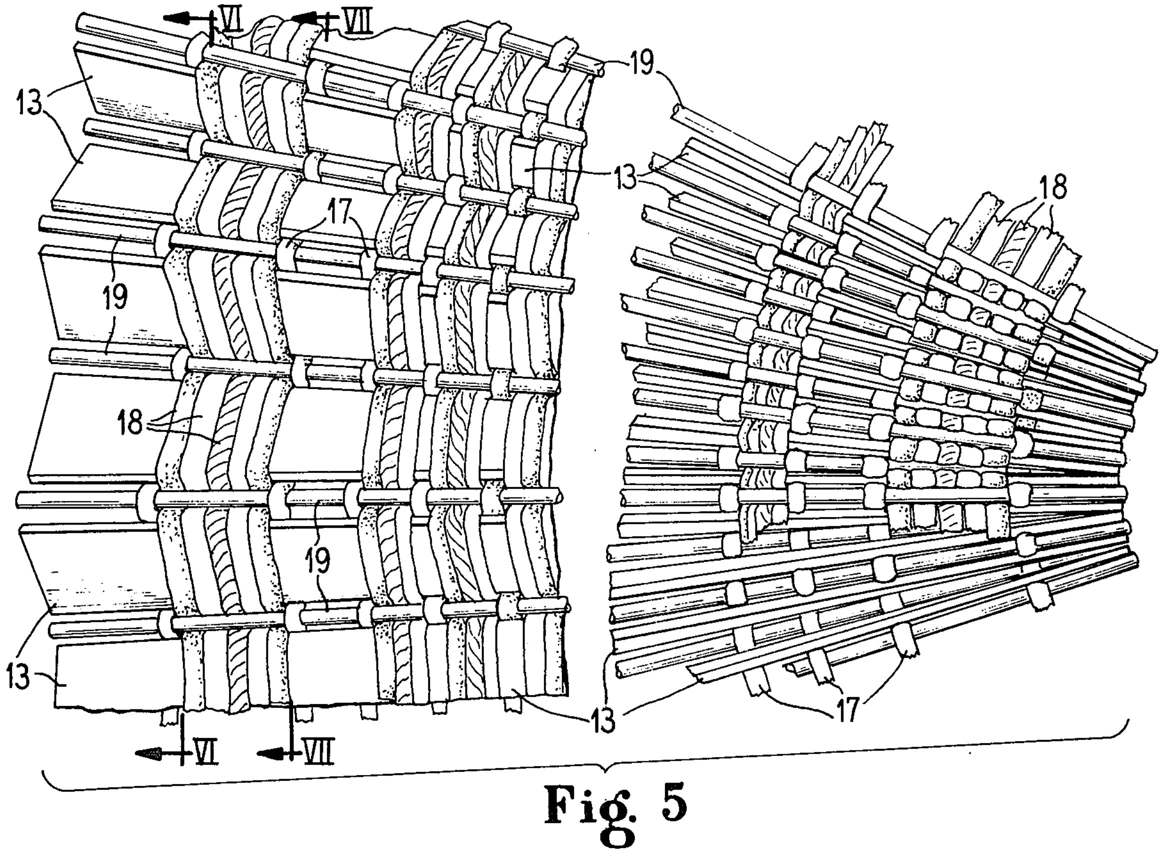
Fig. 5
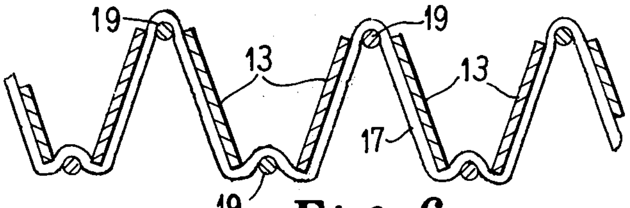
Fig. 6
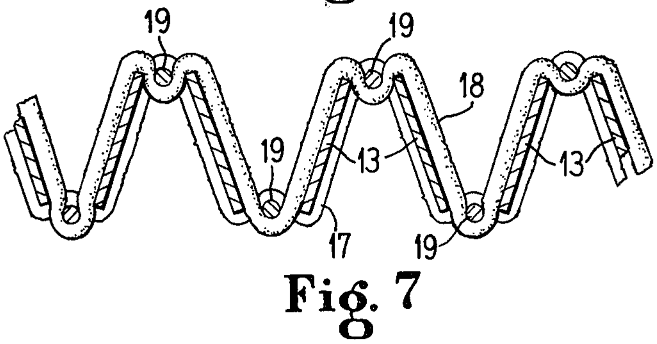
Fig. 7
Fig. 8
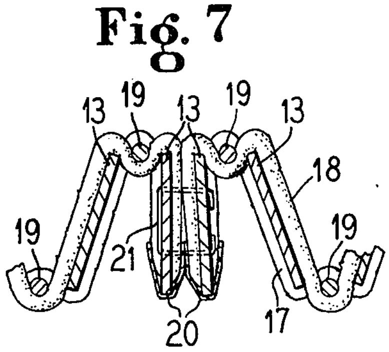

SUNBURST WALL PLAQUE OR THE LIKE AND METHOD OF MAKING THE SAME

This invention relates to the art of ornamental and decorative novelties, and is more particularly concerned with a new and improved sunburst plaque, or the like.

Decorative accents are commonly employed in room furnishings and decorations. Both decorative and mechanical utility are desirably combined in one article for some uses. For example, pleasingly decorative woven wood slat material is advantageously used in slat shades, draw drapes, curtains and the like. Such material comprises thin resiliently flexible wood slats hingedly connected in side-by-side relation by means of yarns woven therewith.

I have discovered that because of the resilient flexibility of the slats it is possible to fan fold strips of the woven wood slat material and shape the same into highly attractive sunburst array and by connecting the ends of the strips after fashioning into the sunburst arrangement, an attractive plaque or the like article is formed.

Accordingly, it is an important object of the present invention to provide a new and improved novelty article such as a sunburst plaque, or the like, and a method of making the same.

Another object of the invention is to provide an article of generally circular form which is adapted to be made from originally rectilinear material.

A further feature of the invention is to provide a novelty article utilizing woven wood slat material.

Still another object of the invention is to provide a new and improved method of making novelty articles from woven wood slat material.

Other objects, features and advantages of the invention will be readily apparent from the following description of certain representative embodiments thereof, taken in conjunction with the accompanying drawings although variations and modifications may be effected without departing from the spirit and scope of the novel concepts embodied in the disclosure, and in which:

FIG. 5 is an illustrative fragmental plan view of a portion of the article depicted in FIG. 1.

FIG. 6 is a sectional detail view taken substantially along the line VI—VI of FIG. 5.

FIG. 7 is a fragmentary sectional detail view taken substantially along the line VII—VII of FIG. 5; and FIG. 8 is an enlarged fragmentary sectional detail view taken substantially along the line VIII—VIII of FIG. 1.

Figure 1:
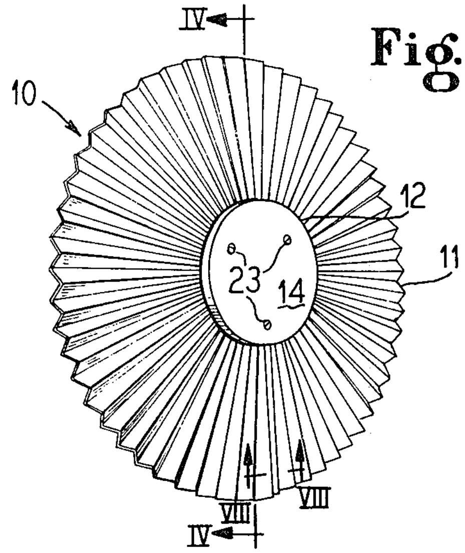
FIG. 1 is a perspective view of a wall plague embodying features of the invention.

A novelty article 10 (FIGS. 1 and 4) embodying features of the invention may be in the form of a sunburst plaque or the like comprising an annular body 11 and central securing means 12. In a preferred construction, the body 11 comprises a sunburst array of radially extending elongated elements 12 in the form of slats which are connected together along their radially extending sides and have their radially inner ends maintained in a substantially common plane by the securing means 12 which comprise at least one, and preferably two disks 14 and 15 attached in clamping relation to the inner ends of the elements 13.

Figure 2:
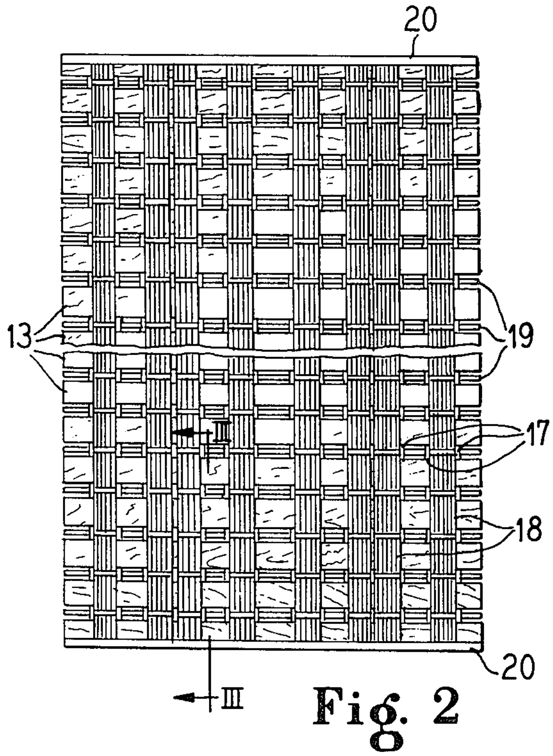
FIG. 2 is a fragmental plan view of a rectilinear strip of material from which an article such as depicted in FIG. 1 is adapted to be made.
Figure 3:
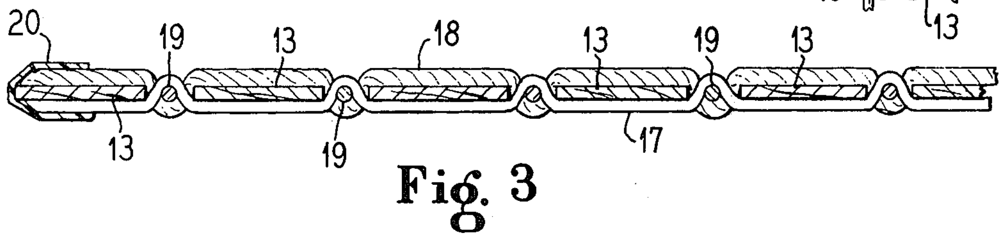
FIG. 3 is an enlarged fragmentary sectional detail view taken substantially along the line III—III of FIG. 2.

For constructing the body 11 woven wood slat material of a type which is generally employed in producing slat curtain, drapes, shades, wall hangings, and the like, may be used. Material of this type as examplified in FIGS. 2 and 3 comprises wood slats providing the elements 13. Means connecting the slats 13 to one another along their radially extending sides comprise flexible strands 17 and 18, preferably in the form of yarn of suitable material, texture and color. In one preferred arrangement, the strands 17 run across the backs of the slats 13. Between the edges of the slats the strands 17 are woven over the front sides of hinge rods 19 locating between each pair of the slats 13. Conversely, the strands 18 extend along the outer or front faces of the slats 13 and are woven around the back sides of the rods 19. By having the strands 17 and 18 alternating with one another in any preferred pattern wherein the strands 18 are of any selected greater number and of any selected color or combinations of colors, attractive ornamental patterns are attained. Any desired width and rectilinear length of the material may be provided. For the present purposes, the slats 13 extend across the width of the strip of rectilinear material and the strands 17 and 18 extend along the length. At the opposite ends of the strip of material, the ends of the strands 17 and 18 are firmly anchored to the end most of the slats 13 by suitable means such as adhesively secured tape 20.

By reason of the hinged connection of the slats 13, they can be readily generally fan folded. Because of the torsionally resilient flexibility of the slats 13 about their longitudinal axes the strip of material readily lends itself to warping to the fan folded material annularly about a center until the ends of the strip meet (FIGS. 1, 5 and 8). At the ends of the strip the endmost slats 13 are secured together by means of suitable fasteners such as staples 21. By way of example, in a typical construction where the plaque 10 is about 3 feet (90 cm) in diameter, there may be from 116 to 120 of the slats 13 about 1 foot (30 cm) long, each slat being about ⅞ inch (23 mm) in width and 1/16 inch (2mm) thick. The hinge rods 19 may be on the order of 3/32 inch (2.5 mm) in diameter. In warping the strip of material into the sunburst form, the radially inner ends of the slats are brought into substantially face-to-face abutment with their extennities defining a center opening substantially as shown at the right side of FIG. 5. The connecting strand yarns 17 and 18 cause the progressively divergent slats 13 to progressively twist by torsional resilient flexing about their axes from adjacent to their radially inner ends to their radially outer ends, as the radially outer perimeter of the annular body spreads circumferentially to accommodate the annular form. The result is a pleasing substantially uniform sunburst appearance of the progressively spreading fan folded sunburst body 11.

After the fan folded material has been secured along the radial joint formed by stapling together the endmost slats of the material, the center disks 14 and 15 are applied as clamping, stabilizing means. To this end, the disk panels 14 and 15 are concentrically disposed in clamping relation to the radially inner ends of the slats 13, concentrically relative to the central opening defined within the radially inner ends of the slats, and suitable means securing the disks in position. Such means may comprise suitable adhesive 22. In addition to or instead of the adhesive 22, the disks 14 and 15 may be secured in clamping relation to the inner ends of the slats 13 by means of fasteners 23 such as bolts, three such bolts being locating equidistantly apart in the particular arrangement shown, wit the heads of the bolts countersunk in the outer face of the outer of the panels 14 and nuts supplied to the inner ends of the bolts at the rear face of the panel 15.

Figure 4:
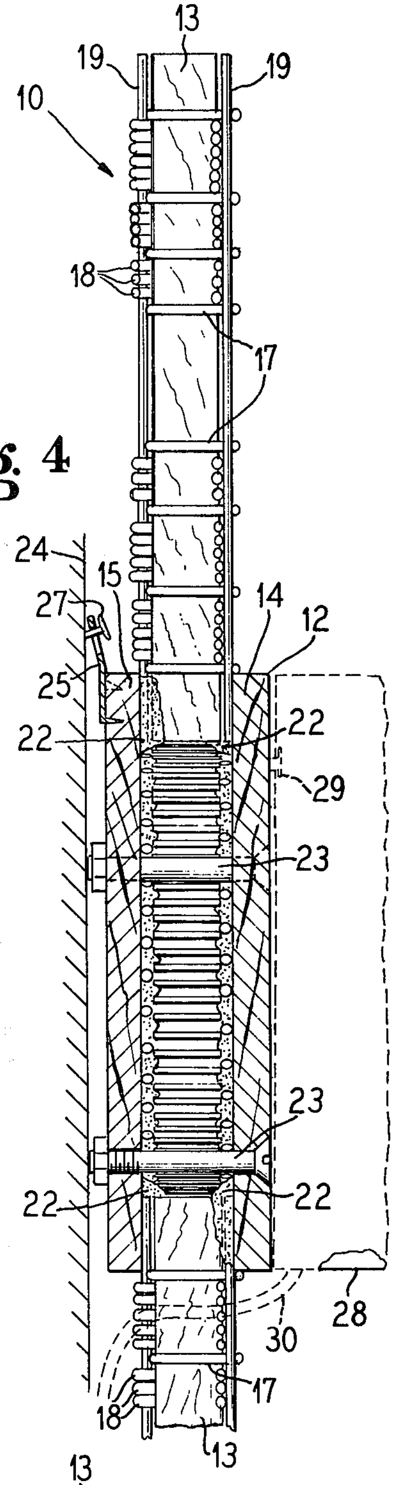
FIG. 4 is an enlarged fragmentary sectional detail view taken substantially along the line IV—IV of FIG. 1.

Means may be provided for hanging the completed plaque 10 on a wall 24 (FIG. 4). For example, an eye type hanger 25 may be secured to the panel 15 for engagement with a stud such as a partially driven nail 27, picture hanger, or the like carried by the wall 24.

If preferred, the outer face of the outer panel 14 may be supplied with suitable ornamentation or suitably decorated, where the plaque 10 is to serve merely as a room decoration. On the other hand, the panel 14 may serve as a supporting base for an instrument such as a clock 28 indicated schematically in FIG. 4, suitable removably secured to the panel 14 as by means of a headed stud 29. Where the clock is electrically operated, its electrical cord 30 may be trained through the body 11 of the plaque between a pair of adjacent ones of the slats 13.

It will be understood that variations and modifications may be effected without departing from the spirit and scope of the novel concepts of this invention.

I claim as my invention:

1. A sunburst plaque, or the like, comprising:

a body having a sunburst array of radially extending slats which are torsionally resiliently flexible about their longitudinal axes;

means connecting said slats to one another along their radially extending sides;

the radially inner ends of the slats being in face-to-face relation, and the slats being progressively divergent from one another form adjacent to said inner ends toward their radially outer ends;

said slats being torsionally resiliently flexed about their longitudinal axes progressively from adjacent to their radially inner ends toward their outer ends;

and means securing the radially inner ends of the slats for stabilizing the body.

2. A sunburst plaque according to claim 1, wherein said connecting means comprise flexible strands.

3. A sunburst plaque according to claim 2, including hinging rods between the edges of the slats, and said strands comprising yarn inter-woven with said slats and said hinging rod.

4. A sunburst plaque according to claim 1, comrpising an annular body formed from an originally substantially rectilinear strip of woven slat material warped into an annular body shape with terminal slats of the strip in abutment, and means joining the terminal slats together.

5. A sunburst plaque according to claim 1, wherein said securing means comprise a panel over the center of the plaque, and means fixing the panel to the radially inner ends of the slats.

6. A sunburst plaque according to claim 1, wherein said securing means comprise a pair of disks applied to opposite sides of said inner ends of the slats, and means fixing the disks in clamping relation to said inner ends.

7. a sunburst plaque according to claim 6, including means on one of said disks for hanging the plaque on a wall.

8. A method of making a sunburst plaque, or the like, comprising:

forming a body by placing into a sunburst array substantially radial slats connected to one another along their radially extending sides;

torsionally resiliently flexing the slats about their longitudinal axes;

securing the radially inner ends of the slats in face-to-face relation;

orienting the slats in progressively divergent relation to one another toward their radially outer ends;

torsionally resiliently flexing the slats about their longitudinal axes progressively from adjacent to their radially inner ends toward their outer ends;

and securing the radially inner ends of the slats to stabilize the body.

9. A method according to claim 8, comprising connecting the slats together by means of flexible strands.

10. A method according to claim 9, comprising and interweaving the strands of the form of yarn with the slats and with hinging rods located between the edges of the slats.

11. A method according to claim 8, comprising providing an originally substantially rectilinear strip of woven slat material having said elements extending between opposite sides of the strip, fanning the strip of material into an annular body shape, placing the terminal slats substantially in abutment, and joining the terminal slats together.

12. A method according to claim 8, comprising fixing a panel to the radially inner ends of the slats as part of the securing means.

13. A method according to claim 8, comprising applying a pair of disks to opposite sides of the inner ends of the slats, and fixing the disks in clamping relation to said inner ends.

14. A method according to claim 13, including equipping one of the disks with means for hanging the plaque on a wall.

* * * * *

UNITED STATES PATENT AND TRADEMARK OFFICE

CERTIFICATE OF CORRECTION

PATENT NO. : 4,027,057

DATED : May 31, 1977

INVENTOR(S) : Victor N. Grumbeck

It is certified that error appears in the above-identified patent and that said Letters Patent are hereby corrected as shown below:

Column 2, line 39 for "to the" read --the--;
Column 3, line 9, for "wit " read --with--; line 41, for "form" read --from--; lines 54 and 55 for "comrpising" read --comprising--;
Column 4, line 34, omit "and"

Signed and Sealed this

*Fifteenth* Day of *November 1977*

[SEAL]

*Attest:*

RUTH C. MASON
*Attesting Officer*

LUTRELLE F. PARKER
*Acting Commissioner of Patents and Trademarks*